Feb. 1, 1966    J. L. GRATZMULLER    3,232,044
SUPERCHARGING APPARATUS

Filed Jan. 17, 1964    3 Sheets-Sheet 1

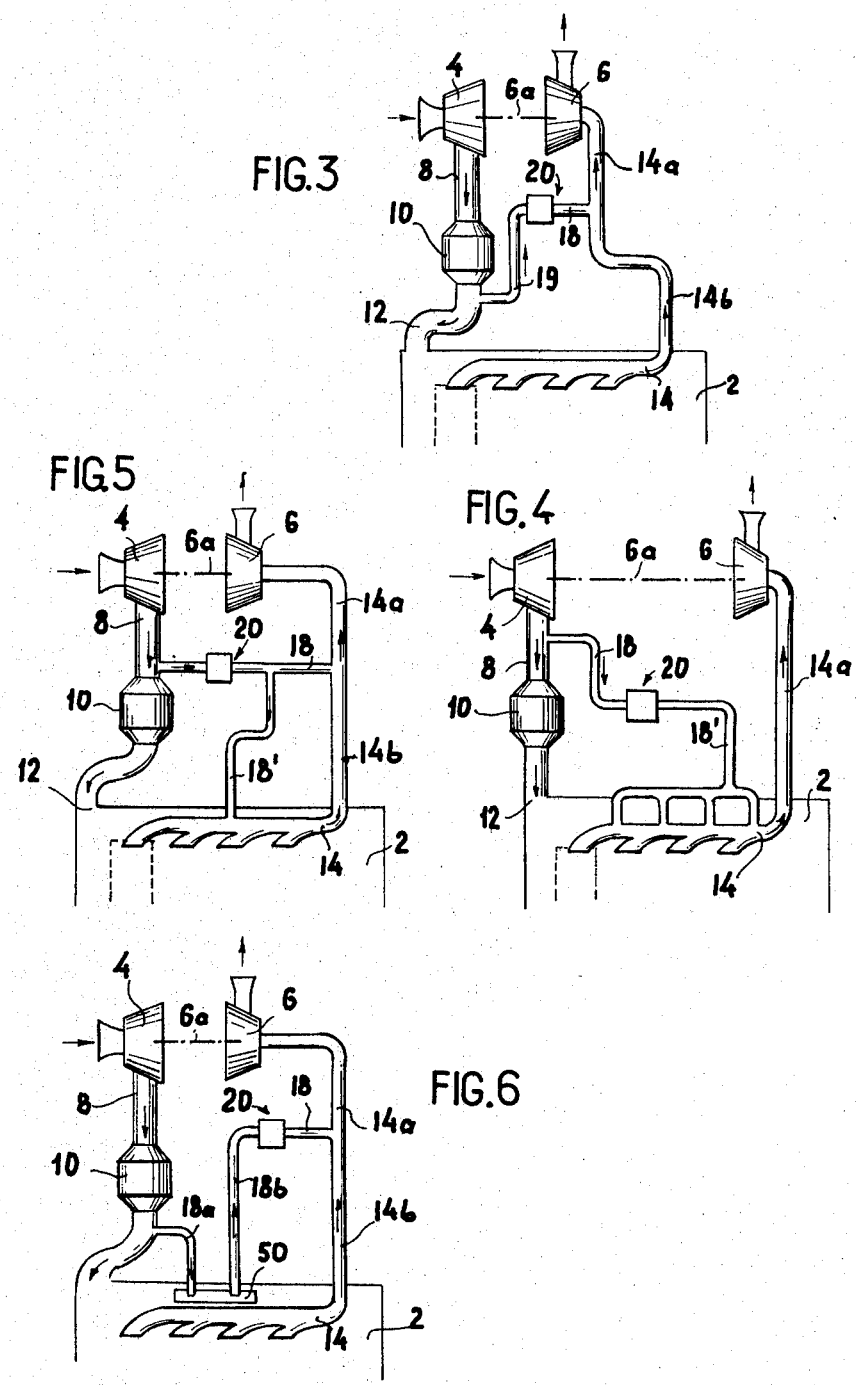

United States Patent Office 3,232,044
Patented Feb. 1, 1966

3,232,044
SUPERCHARGING APPARATUS
Jean Louis Gratzmuller, 66 Blvd. Maurice Barres,
Neuilly-sur-Seine, France
Filed Jan. 17, 1964, Ser. No. 338,401
Claims priority, application France, Jan. 18, 1963,
921,797
3 Claims. (Cl. 60—13)

This invention relates generally to apparatus for supercharging engines, and finds significant utility when utilized with internal combustion engines and particularly diesel engines.

In the conventional cyclically operated internal combustion engine, air is admitted into each of the engine cylinders at a selected time during the cycle of operation, and the admitted air as mixed with a fuel is ignited. The consequent thermal expansion drives the piston within each cylinder as the expansion takes place. The power of the engine is accordingly directly related to the efficiency of the thermal expansion.

To increase the efficiency of the thermal expansion, and in turn to increase the power of an engine, supercharging techniques have been previously suggested and employed. Basically, such techniques are directed to increasing the efficiency of the thermal expansion by providing a greater air density, and in turn a greater oxygen density in the cylinders so that the air-fuel mixture can experience a more complete burning and a resulting more efficient thermal expansion.

For purposes of accomplishing a relatively simple supercharging operation, it has previously been suggested that a supercharging arrangement be provided in which intake air from the atmosphere is compressed before being fed to the cylinders, and in which the exhaust gases of the engine are used to operate a means for compressing the intake air. Specifically, the conventional arrangement in this regard includes a compressor receiving the atmospheric air and compressing the same; means for cooling and delivering the compressed air to the intake manifold of the engine, a turbine means for driving the compressor, and means for directing the exhaust gases of the engine through the turbine means to drive the same.

While such a system can be simply constructed, and while such a system would appear to afford the desired advantage, there are substantial limitations on the operation of the system. To comprehend such factors, it is necessary to first understand the desired and/or required criteria for operation of the system.

From the desirability standpoint, one wishes to obtain as large a compression of the intake air as possible, that is, as large a supercharging ratio or rate as possible. The supercharging rate is conventionally defined as a ratio of the intake pressure to the atmospheric pressure. Notwithstanding the desirability of increasing the supercharging rate, with every increase in pressure of the intake air, there is a corresponding increase in the temperature of the air. Specifically, when the air is compressed by a compressor, the temperature thereof is inherently increased. With each increase in the temperature of the intake air, the quantity of air which can be introduced in a particular cylinder decreases since, in accordance with basic physics principles, the greater the temperature of the air, the more pressure required to force a given quantity of air of a given density within a given space.

Even further, with an increase in pressure of the air, and with the consequent increase in temperature of the air, there is a resulting increase in temperature of operation of the engine, and significantly an increase in temperature of the exhaust gases.

Increasing the temperature of the exhaust gases beyond a reasonable limit (e.g. over 600° to 650° C.) cannot be tolerated in a compressor-turbine drive means as described above because of the corroding and/or other destructive effects which overly hot exhaust gases have on the blades or fins of the turbine. Thus, merely increasing the supercharging rate or the pressure of the intake air to effect the supercharging of the engine does not necessarily, in and of itself, give a more beneficial result. Instead, the increase in pressure of the air fed to the cylinders must be accompanied by a capacity of the system to effectively utilize the increased pressure air by feeding an increased air density to a particular cylinder, and by a capacity of the system to effectively utilize the exhaust gases of the engine for drive of the compressor means without undue destruction of the drive components.

Thus, to obtain a supercharging rate of the order of 1.5 or more, it is essential to control the temperature of the compressed intake air as well as the temperature of the exhaust gases. A heat exchanger can be provided between the compressor means and the intake manifold of the engine so as to lower the temperature of the compressed air. Furthermore, a scavenging technique can be employed to control the internal temperature of the engine, and in turn the exhaust gas temperature. It has been found that for every 10° C. decrease in temperature of the compressed air prior to its introduction into the intake manifold of the engine, there is a resulting increase in power of the order of 3%. Thus, decreasing the temperature of the intake air following its compression affords one means of controlling the critical temperatures in question. Similarly, by using a scavenging technique, some control can be provided on the internal temperature of the engine. As well known, scavenging, as used in the context of the art to which the present invention relates, means the circulation of air through the cylinders of the engine during simultaneous opening of the intake and exhaust valves of the cylinder so as to internally cool the engine. The cooling operation corresponds closely to the conventional cooling operation achieved by using a circulating cooling liquid.

Although using a heating exchanger to reduce the temperature of the compressed intake air, and using a scavenging technique to reduce the internal temperature of the engine may afford some advantage, such temperature control techniques do not permit suitable operation where supercharging rates are over 1.5. The weight and size of the auxiliary cooling devices tend to increase much more rapidly than the supercharging pressure thus eliminating the practical feasibility and the advantages of higher supercharging rates.

With scavenging techniques, the energy loss can be substantial since the volume of air employed for efficient scavenging operations can represent 30% of the total volume of air fed to the engine.

Equally as important, and possibly even more important, is the fact that with increased supercharging rates and temperature control techniques such as described above, the temperature of the exhaust gases exceeds permissible values and causes corrosion and/or other destructions of a turbine drive means such as suitable for driving an air intake compressor for the supercharging system. The significance of this latter aspect can readily be appreciated when one realizes that temperatures over 600° to 650° C. are encountered in the exhaust gas stream of an engine under actual operating conditions.

Of course, if the engine is being employed for marine uses, then increasing the supercharging rate does not present as severe problems as where the engine is being used in land operations, for example, as the power source of a locomotive. In the case of marine use, the supercharging rates can be substantially increased because of the availability of an unlimited cooling source, namely the water surrounding the vessel on which the engine is used. Still, as indicated above, for land operations, and in particular locomotive operations, it was previously necessary to sacrifice the extra power which could be achieved by supercharging because the practical considerations eliminated any factual advantage being obtained through the use of supercharging techniques.

Bearing in mind the foregoing, the present invention has as its principal object the provision of a method of, and apparatus for, supercharging cyclically operating engines, which method and apparatus serve to compress the intake air for the engine and utilize the exhaust gases to achieve the intake compression, and yet which method and apparatus insure adequate cooling of the compressed intake air, and significantly, adequate cooling of the exhaust gases without requiring oversized or bulky heat exchange or cooling means.

More generally, the primary object of the present invention is to provide a supercharging process and apparatus which permit a supercharging rate substantially higher than those presently obtainable, and which at the same time, result in more output power for a given engine.

Still further, it is a significant primary object hereof to provide a supercharging process and apparatus which, for any given supercharging rate, including those now used, yield more efficient operation, and in turn, increased power over that presently obtainable with systems operating with the same supercharging rate.

Consistent with the foregoing objects, it is an additional important object of the present invention to provide such a supercharging method and apparatus which substantially reduce losses otherwise resulting from scavenging operations, and which, in fact, can eliminate the need for any scavenging operation such as employed previously. In this regard, a more detailed object hereof is to increase the system efficiency by more adequately cooling compressed engine intake air, and reducing or eliminating the necessity and/or requirements of cooling scavenging air, and in turn cooling losses.

In satisfaction of the foregoing objects, the method of the present invention provides for supercharging an engine having an air intake and an exhaust gas stream, by (a) compressing air from the atmosphere to form a compressed air stream; (b) cooling at least a portion of the compressed air stream; (c) feeding the compressed air stream as cooled to the intake of the engine; (d) diverting a portion of the compressed air stream into the exhaust gas stream of the engine to form a mixed gas stream having a temperature lower than the temperature of the exhaust gas streams; and, (e) using the mixed gas stream to compress the air from the atmosphere and form the compressed air stream.

The apparatus provided hereby for carrying out the method includes a compressor means for receiving air from the atmosphere, a heat exchange means for receiving air from the compressor means and lowering the temperature thereof prior to feeding of the compressed air to the intake of the engine, a turbine drive means for the compressor, means for directing the exhaust gas stream from the engine through the turbine drive means, and means for diverting a portion of the compressed air stream into the exhaust gas stream for mixing therewith so that the resulting mixed gas stream has a low temperature as it encounters and passes through the turbine drive means. Consistent with the preferred embodiment hereof, the means for diverting the portion of the compressed air stream into the exhaust gas stream includes control means responsive to a given operating condition, such as a temperature or pressure, for adjusting and regulating the diverted portion of the compressed air stream with variations in the particular condition.

The invention will be better understood and objects other than those specifically set forth above will become apparent when consideration is given to the following detailed description. Such description makes reference to the annexed drawings presenting preferred and illustrative embodiments of the invention.

In the drawings:

FIGURE 3 is a fragmental schematic view showing a modification of the basic system of FIGURE 1;

FIGURE 4 is a fragmental schematic view showing another modification of the basic system of FIGURE 1;

FIGURE 5 is a further fragmental schematic view of an additional modification of the basic system of FIGURE 1;

FIGURE 6 is still another fragmental schematic view of a further modification of the basic system of FIGURE 1;

Figure 1:
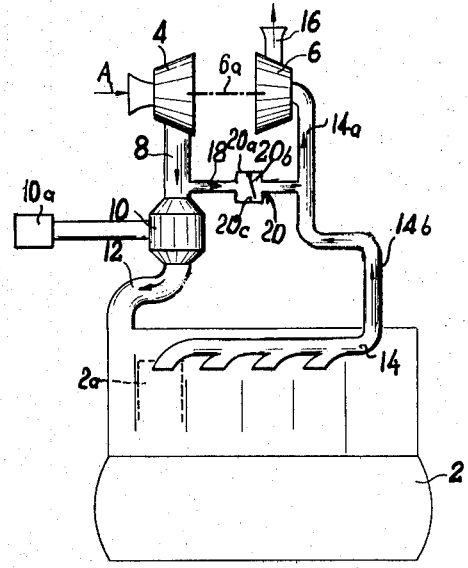
FIGURE 1 is a schematic view of a basic supercharging system constructed in accordance with the present invention and associated with a diesel engine.

In the figures, the numeral 2 generally designates an engine, and in particular, a conventional diesel engine having an intake manifold 12 and an exhaust manifold 14. The intake manifold 12, as normal, is adapted to receive an intake air stream and distribute the same to the respective cylinders of the engine. (The cylinders are conventional and thus only cylinder 2a is schematically shown.) The exhaust manifold 14, on the other hand, is adapted to receive an exhaust gas stream from the engine cylinders.

Consistent with the method hereof, and as indicated above, air from the atmosphere is initially compressed to form a compressed air stream, and then, at least, a portion of the compressed air stream is cooled and directed through the intake manifold 12 for distribution to the respective cylinders in accordance with the operation of the valves (not shown) associated therewith. A portion of the compressed air stream, however, is diverted into the exhaust air stream to form a mixed gas stream having a temperature lower than the temperature of the exhaust gas stream. The mixed gas stream is in turn used to compress the air from the atmosphere and form the compressed air stream.

More particularly, the intake manifold 12 is coupled with the output of a cooling means 10, and the cooling means 10 is in turn coupled through the conduit 8 with a compressor means 4. The compressor means 4 preferably takes the form of a centrifugal compressor and receives air from the atmosphere, as indicated by the arrow A in FIGURE 1. The cooling means 10, on the other hand, can take various forms, but preferably comprises a liquid air heat exchanger of conventional design, wherein circulating cooling liquid is supplied from an independent circuit, e.g., a circuit 10a.

The exhaust manifold 14 is coupled with the intake of a turbine drive means 6 which preferably takes the form of a cage turbine. The turbine drive means 6 is linked, as schematically indicated at 6a, with the compressor means 4 so that the turbine drive means serves to drive the compressor means 4. The exhaust gas stream which leaves the engine 2 passes through the manifold 14, and consistent with the invention, the exhaust gases are mixed with other gases to form a mixed gas stream which enters the turbine drive means 6 to impel the blades or fins (not shown) of the turbine before being discharged through the turbine outlet 16.

The mixed gas stream which enters the turbine drive means 6 comprises the exhaust gas stream leaving the engine through the exhaust manifold 14 as well as a portion of the compressed air stream which is diverted into the exhaust gas stream, as through the diversion duct 18. In accordance with the preferred embodiment of the invention shown in FIGURE 1, the diversion duct 18 connects with the compressed air duct 8 upstream of the cooling means 10 and downstream of the compressor means 4. The duct 18 therefore receives a part of the compressed air stream on the left end thereof, as shown. The duct 18, as also shown, leads on its righthand end into the exhaust manifold conduit 14a upstream of the manifold 14 proper, but downstream of the turbine drive means 6.

Preferably, a control means 20 in the form of a valve, is disposed in the duct 18 intermediate the ends thereof. Such control means, as explained more fully below, can be effectively utilized to regulate the portion of the compressed air stream diverted from the conduit 8 into the exhaust conduit 14a in accordance with operation of the system.

Now, turning to the operation of the system of FIGURE 1, air from the atmosphere is drawn into the intake of the compressor means 4, whereupon such air is compressed to form a compressed air stream. Inherently, with the compression, there is an increase in the temperature of the compressed air stream over the temperature of the atmospheric air. The compressed air stream leaving the compressor means 4 is accordingly a heated air stream. The heated condition of the air stream is undesirable since it limits the density of the supercharging as explained above. Accordingly, the compressed air stream is cooled by the cooling means 10 so as to reduce the temperature thereof to a suitable value, for example, a temperature of the order of 50° to 80° C.

It is to be noted in this regard that the preferred embodiment contemplates diverting a portion of the compressed air stream above the cooling means 10. With such an arragnement, only that portion of the compressed air stream to be fed to the intake manifold 12 of the engine is cooled by the cooling means 10. The significance of this factor is explained more fully below, and suffice it to note here that in any event, however, the major portion of the compressed air stream is fed to the intake manifold 12.

By providing a compressed air stream, and by cooling the compressed air stream, the quantity of air admitted to any cylinder of the engine 2 during operation is substantially increased and accordingly, the power of the engine is substantially increased. The increase in the supercharging rate and in turn the increase in power is not limited as with previous supercharging arrangements, however. The supercharging need not specifically be limited by the temperature of the exhaust gases produced by the engine at the exhaust manifold. Instead, the temperature of the exhaust gas leaving the engine through the exhaust manifold 14 can be substantially higher than with previous arrangements, because consistent with the invention, the exhaust gas stream is effectively cooled prior to entering the drive turbine means 6. Specifically, the exhaust gas stream is mixed with that portion of the compressed air stream diverted from the conduit 8 through the smaller diversion conduit 18. The mixing is such to substantially reduce the temperature of the exhaust gas stream to a suitable value, i.e., to a value of the order of 600° to 650° C.

With an arrangement and operation as prescribed above, scavenging operations can be substantially reduced and, in fact, even eliminated. In practice, it has been found that with the systems hereof, the scavenging period can comprise between 0% and 5% of the engine cycle. There is thus an increase in power resulting from the reduction or elimination of the scavenging. Admittedly with the reduction or suppression of the scavenging, the combustion chambers or cylinders of the engine are subject to higher thermal forces but the additional forces and increased temperatures can be tolerated without disadvantage, since circulating liquid cooling systems, commonly associated with engines of the type in question are not used to their fullest capacity in the normal instance. In other words, the conventional cooling systems can be utilized quite adequately to cool engines with which the supercharging apparatus and methods hereof are associated. The invention thus does not require an increase in the cooling capacity of the conventional cooling system employed with the engine, but instead merely utilizes the same to its full capacity.

By eliminating or substantially reducing the scavenging which can result in a substantial power loss, by increasing the supercharging rate, and by cooling the exhaust gases through a mixing and diversion technique, the invention yields a system capable of more efficient operation, without being subject to the disadvantages of prior systems. Supercharging rates of the order of 2 to 2.2 can readily be achieved with the system of FIGURE 1, thus increasing the power to a substantially greater point than the recognized limits available from present commercial systems.

With respect to scavenging, it will be remembered that prior systems used as much as 30% of the total air intake to cool the engine through scavenging to a desired degree so as to minimize exhaust temperatures. In contrast, with the present invention, diverting 10 to 15% of the compressed air stream to the exhaust gas stream provides sufficient cooling thereof. Moreover, the cooling means need not act on the diverted portion of the compressed air stream, and thus the cooling means can operate more efficiently—by comparison, operating on a smaller volume of air, thus rendering such volume substantially cooler, and thereby increasing the efficiency of the supercharging, burning, thermal expansion, and in turn, engine power.

Where the invention is applied to an engine operating at the usual supercharging rates, as well as in the case where the supercharging rate is substantially higher, such as in the system to be described below, the principal function of the control means 20 described above, is to permit the circulation or distribution of air within the diversion duct 18 in the direction from the compressor means 4 toward the exhaust conduit 14a. A conventional one-way valve can be employed to serve this function. Such a valve, as well known, automatically operates in response to pressure differentials prevailing upon opposed faces thereof. When coupled in the system hereof and connected with the ducts 8 and 14a, it would not open until the supercharging pressure in the duct 8 exceeded the pressure of the exhaust gas stream in the duct 14a. By utilizing the control means, such as a one-way valve, any possibility of return of the exhaust gases in the direction of the intake is eliminated. With a one-way valve operating on a pressure differential as described, the supercharging pressure must be sufficient to open the valve initially, and thus at certain times, there would be no diversion of the compressed air stream through the duct 18 into the exhaust stream in the duct 14a. However, at these certain times, no serious disadvantage is encountered because at such times the engine is operating at slow speeds, and the exhaust gases are not unduly hot, or above the critical temperature limits imposed thereon.

As an alternative to coupling the auxiliary or diversion duct 18 with the compressed air stream duct 8 upstream of the cooling means 10, such duct can be connected directly with the intake manifold 12, as shown in FIGURE 3. In this instance, the diverted portion of the compressed air stream would have a temperature of the order of 60° to 80° C., as opposed to the 150° to 180° C. which it has as it leaves compressor means 4. The result is a somewhat greater lowering of the exhaust gas stream temperature prior to entry in the turbine drive means 6. However, the temperature differential between the exhaust gas stream and the compressed air stream in either instance is considerable, and thus the advantage of diverting a portion of the compressed air stream after it leaves the cooling means 10 is outweighed by the disadvantage in cooling more air with the cooling means 10. In other words, it has been found that operation is more efficient if only that portion of the compressed air stream which is to be directed to the intake manifold 12 is cooled, as opposed to cooling the total compressed air stream, including the portion to be diverted through the duct 18. Specifically, greater cooling of the intake air which is actually fed to the intake manifold 12 increases the efficiency of the system well beyond the efficiency which could be achieved with an alternate arrangement wherein even the diverted portion of the compressed air stream is initially cooled, provided component cooling is not desired or necessary.

Just as the inlet end of the duct 18 can be connected in alternate positions with the compressed air stream flow path, such duct can be alternately connected with the exhaust gas stream. Consider, for example, FIGURE 4, wherein the duct 18 as opposed to being connected with the conventional outlet conduit of the exhaust manifold 14, is connected with the exhaust manifold 14' by a branched conduit 18'. The branched duct 18' opens directly over the exhaust collector of the manifold, thus providing somewhat more efficient exhaust for the engine, and consequently cooler operation of the exhaust valves.

As an alternate to the arrangement of FIGURE 4, the arrangement of FIGURE 5 can be incorporated. Here, the auxiliary conduit 18' is provided in addition to the conventional outlet conduit portion 14b of the manifold 14. In this instance, the duct 18 is essentially split so as to increase the efficiency of the exhaust, thereby lowering the exhaust valve temperatures, if desired.

Still further, in accordance herewith, the arrangement can be constructed as shown in FIGURE 6. Here, that portion of the compressed air stream which is diverted from the duct 8, initially enters a diverting conduit 18a after traveling through cooling means 10. The diverted air then passes adjacent the exhaust valves 50 of the engine 2. The stream is then directed through a further auxiliary conduit 18b so that the same returns to the conduit 18 in this manner, that diverted portion of the compressed air stream serves to cool the exhaust valves, and at the same time serves to cool the exhaust gas stream. The conduits 18a and 18b, respectively, lead to cavities of any suitable design, on the cylinder head, thereby rendering the thermal fatigue to which the valves in such cylinder head are normally subjected at a minimum. The cooling of the more critical points of the cylinder head permits the operation of the engine at a temperature level substantially greater than those which can be encountered with present diesel engines including those having supercharge systems connected therewith. In essence, the system of FIGURE 6 represents an advantageous use of the type system shown in FIGURE 3, by providing for component cooling. Moreover, in this instance, at a very small sacrifice to the cooling efficiency of the exhaust air stream, the cooling system of the apparatus is in no way strained and essentially the engine cooling is augmented by the modification of FIGURE 6.

Figure 7:
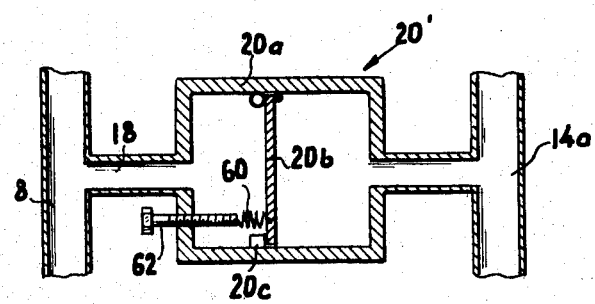
FIGURE 7 is a transverse sectional view of a modified control means which can be used with systems of FIGURES 1 and 2.

Regardless of the arrangement of the diversion duct 18 and other diverting ducts associated therewith, the control means 20 is preferably coupled in the duct 18 to control the flow between the compressed air conduit or duct 8 and the exhaust stream conduit 14a. As shown in FIGURE 1, the control means 20 comprises a housing 20a with a plate valve 20b movable therein toward and away from seal 20c. As so constructed, when the pressure on the compressed air side of the plate 20b is above the pressure on the exhaust gas stream side of such plate, then the plate swings open permitting the diversion of the air from the duct 8 to the duct 14a. As an alternative to such arrangement, the control means 20 can take other forms. For example, in FIGURE 7, control means 20' is shown. This control means includes the housing 20a and the plate valve 20b which is swingable into sealing engagement with the seal 20c so as to effectively disestablish communication between the duct 8 and the duct 14a through the auxiliary conduit 18. In this instance, however, a coil spring 60 is coupled with the plate 20b at one end, and coupled at its opposite end with an adjusting screw 62. The screw 62 is threaded in the housing 20a whereby as the screw is turned so as to move outwardly, the tension exerted by the spring 60 on the plate 20b increases. As a result of this arrangement, the air which is diverted through the diversion duct or conduit 18 is automatically increased as a function of the pressure differential prevailing on the two sides of the plate 20b. In other words, the plate 20b will not move to open position merely upon experiencing a pressure differential on opposite sides thereof, but instead will only move to an open position when the pressure differential exceeds a given value. This operation yields a relatively constant temperature of the gas mixture driving the turbine.

Figure 8:
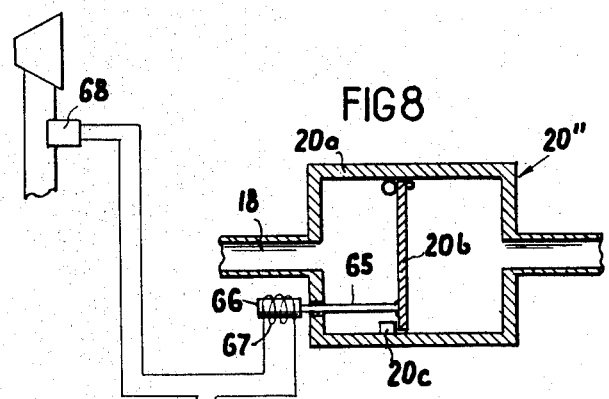
FIGURE 8 is a transverse sectional view of another modified control means which can be used with the systems of FIGURES 1 and 2; and, FIGURE 9 is a further transverse sectional view of an additional modified control means which can be used with the systems of FIGURES 1 and 2.

A still further modification of the control means is shown in FIGURE 8. Here the control means 20" also includes the plate 20b, the housing 20a and seal 20c. The plate 20b, however, is linked as by a pivotally connected rod 65 with core 66 of solenoid 67. The solenoid is connected with a source of power, and with a switch type sensing element 68 disposed at the outlet of the compressor means 4. The sensing means 68 determines when the pressure of the compressed air stream is above or below a predetermined value, and in accordance with the pressure being sensed thereby, operates the solenoid to lock the plate 20b of the control means 20' in closed position. In other words, the sensing means 68 can be of the type which operates to close the circuit through the solenoid 67 when the pressure experienced thereby exceeds a predetermined value, or can be of the type which completes the circuit when the pressure experienced thereby is below a predetermined value.

Figure 9:
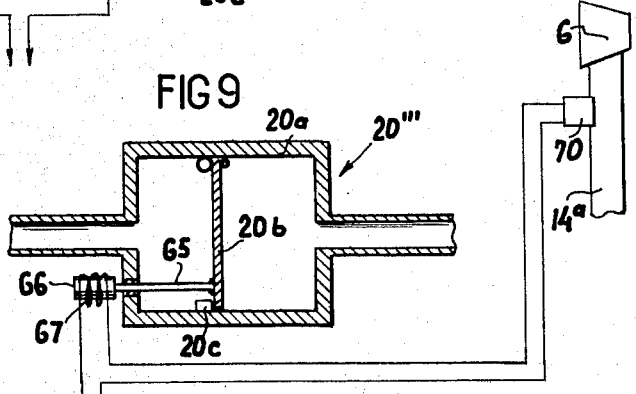

The control means of FIGURE 9 corresponds quite closely with the control means of FIGURE 8, but with the arrangement of FIGURE 9, temperature serves as the control condition. Specifically, in FIGURE 9 the control means 20''' includes the housing 20a, the plate 20b, the seal 20c, the pivotally mounted arm 65, and the solenoid 67 with its core 66 operatively connected to the arm 65. The solenoid, in this instance, however, has a conventional switch-type temperature sensing means 70 connected in circuit therewith.

Sensing means 70 is responsive to the temperature at the inlet of the turbine means 6, and when such temperature reaches given value, the sensing means 70 operates the solenoid 67 to open the valve plate 20b thereby diverting the air for mixture with the exhaust gas stream and resulting cooling of the gas being fed to the turbine means 6.

It will be appreciated that the particular control means which is employed, or the particular combination of control means employed will vary depending upon the supercharging rate desired and the power which is necessary for a particular operation. Still, each of the control means described can be used with the basic system of FIGURE 1, as well as with the double-cooling system of FIGURE 2 described below.

Figure 2:
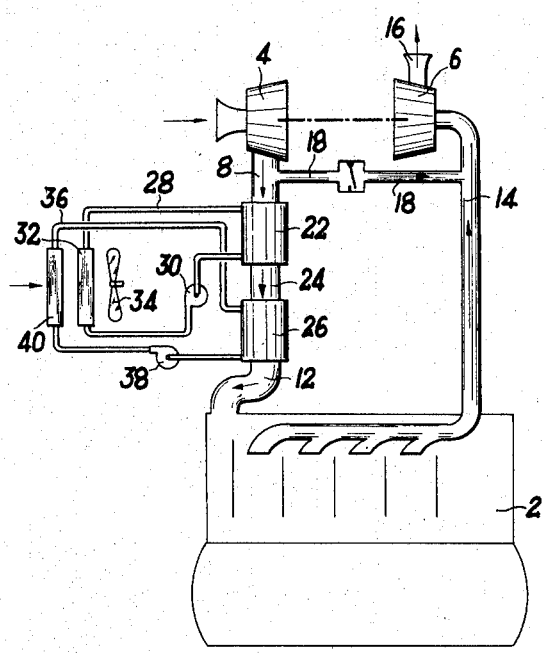
FIGURE 2 is a schematic view of a modified double cooling supercharging system constructed in accordance with the present invention and associated with a diesel engine.

Before referring to FIGURE 2, it is to be noted that the embodiment of the invention described above and represented by FIGURE 1 generally, not only permits increasing the power of the engine without noticeably increasing the superchanging rate, but it also permits supercharging the engine at a rate exceeding the actual rated value, for example, at a rate ranging from 2.2 to 2.6. In fact, heretofore, it was necessary to cool the air introduced into the engine substantially more than it is with the present invention. Specifically, the superchanrged inlet air had to be brought to a much lower temperature so that the exhaust gases would not have an output temperature which, all other things being equal, had to be below a particular value to operate the turbine drive means. In essence, prior systems required increasing the capacity of the cooling means 10, and this proved to be economically impossible for want of space beyond certain limits, whereas the instant invention permits engine operation at higher temperatures and cools the exhaust stream efficiently after it leaves the engine and without bulky equipment.

Notwithstanding the advantages which can be obtained with the embodiment of FIGURE 1, the actual preferred embodiment of the present invention contemplates using an arrangement such as shown in FIGURE 2. The system of FIGURE 2 differs from the system of FIGURE 1 in that the compressed air stream is cooled in two stages instead of one. By referring to FIGURE 2, it will be noted that in the system there presented the compressed air duct 8 is connected to a first cooling means or heat exchanger 22, and that the outlet of the first heat exchanger is connected through a duct 24 to a second cooling means or heat exchanger 26. The first heat exchanger serves to reduce the temperature of the compressed air stream to a first predetermined level, and the second heat exchange means serves to reduce the temperature of the compressed air stream to a second predetermined level below the first predetermined level. Therefore, the first heat exchanger 22 is essentially a high temperature exchanger, whereas the second heat exchanger can be regarded as a low temperature exchanger.

Bearing in mind the function of the respective heat exchangers, but before discussing the operation of the system of FIGURE 2, it is desirable to consider the standard diesel engine construction. Generally, large diesel engines have two cooling circuits, one operating at a high temperature for cooling the engine, and the other operating at a lower temperature for cooling supercharging air and lubricating fluid when the operating temperature of the first circuit is excessively high. In general, the size of the radiator portion of the lower temperature heat exchanger limits the increase of the supercharging rate. However, in accordance with the present invention, these two circuits are employed in succession for cooling the supercharging air.

Specifically, the first heat exchanger 22 serves to reduce the temperature of the compressed air stream leaving compressor means 4. This is accomplished by use of a conventional auxiliary cooling circuit including the line 28, the radiator 32, and the circulating pump 30. The radiator 32 is air-cooled—the fan 34 serving to direct an air stream therethrough.

The second heat exchanger 26, or low temperature heat exchanger, serves to further cool the compressed air stream with the low temperature heat exchange circuit. Such low temperature heat exchange circuit is also conventional and includes a line 36 having therein a radiator 40 and a circulation pump 38. The fan 34 again draws the air stream across the radiator 40 and in turn simultaneously across the radiator 32.

In the usual instance, the cooling liquid in the line 28 is at a temperature of around 70° to 80° C. However, in an engine provided with the cooling circuit under pressure such as described in French Patent No. 1,252,170, entitled Cooling Apparatus for Internal Combustion Engine, as well as in Certificates of Addition No. 77,300 and 78,838, this temperature can be above 100° C.

By way of example, in the case of a supercharging rate of 3, with air taken in a 35° C. from the atmosphere, the air emerging from the outlet of the compressor means 4 would be at a temperature of approximately 177° to 187° C. following the adiabetic efficiency of the compressor or blowing. If the cooling liquid in the high temperature exchanger circuit is of the order of 100° C., the compressed air stream would have its temperature lowered about 70° C. in the first heat exchanger—i.e., the compressed air will leave such heat exchanger a temperature of about 110° C. But, since it is possible to introduce the compressed air stream to the engine at a constant temperature regardless of the supercharging rate (for example, at about 60° C.) by diverting the desired quantity of air in the diverting duct 18 for mixture with the exhaust gas, the number of calories being extracted by the low temperature heat exchanger can be maintained substantially constant regardless of the supercharging rate. Accordingly, the system hereof eliminates those severe cost and size problems previously faced with low temperature heat exchangers where a supercharging rate between 2.2 and 2.3 is desired.

As with the embodiment of FIGURE 1, it has been found to be advantageous to separate the diverted air from the compressed air stream in advance of the time that the same encounters the heat exchangers. Specifically, as shown in FIGURE 2, it is preferable to connect the duct 18 with the duct 8 above the heat exchange means 22, as opposed to connecting the duct 18 with the duct 24 unless component cooling is essential for a given engine, in which event, as with the arrangement of FIGURE 4, the diverted air can be initially cooled.

The exhaust gases are, for example, at a temperature of the order of 750° C. On the other hand, the compressed air would be at a temperature of the order of 180° C. for a supercharging rate of 3. The use of cooler gases leaving the high temperature exchanger 22 would result in using cooled diverted gases having a temperature of the order of 110° C. However, the diminution of the volume of the diverted air does not even represent 2 to 3% of the total volume required to obtain a uniform temperature of the mixed gases entering the turbine drive means 6. It is thus more advantageous to cool the intake air separately so as to realize more efficiently the advantages of the present invention. However, in the case where the diverted air serves to cool the exhaust valve boxes, as indicated heretofore and specifically in connection with FIGURE 4, it has been advantageous in certain instances to connect the diverting duct 18a, for example, to the duct 24 of FIGURE 2 between the high and low temperature heat exchanger so as to improve the engine cooling provided by engine cooling system, which in this instance is the heat exchanger 22.

While not specifically stated above, it should be apparent that the components in the system of FIGURE 2 are identical to those in the system of FIGURE 1 except as noted with respect to the dual heat exchangers and double cooling.

Having now described illustrative and preferred embodiments of the present invention in considerable detail, it will be appreciated that the objects set forth at the outset of the present specification have been successfully achieved. Accordingly,

What is claimed is:

1. Supercharging apparatus for use with diesel engines having intake means, exhaust means, an internal water cooling system and a separate lubricant cooling system, said supercharging apparatus comprising:

(A) An intake air path including compressor means for compressing air, and cooling means for cooling compressed air, (a) said cooling means comprising first and second successively arranged heat exchangers and being coupled to said compresser means to receive compressed air therefrom and coupled to said intake means to direct cooled compressed air thereto;

(b) said first heat exchanger being connected in said internal water cooling system as part thereof;

(c) said second heat exchanger being connected in said separate lubricant cooling system as part thereof;

(B) An exhaust air path including turbine means for driving said compressor means, said turbine means being coupled to said exhaust means to receive engine exhaust gases to drive said turbine means, (C) A diversion air path including duct means for diverting compressed air from said intake air path to said exhaust air path, and (D) Control means for controlling the flow of compressed air through said duct means.

2. Supercharging apparatus for use with diesel engines having intake and exhaust means, said apparatus comprising:

an intake air path including compressor means for compressing air and cooling means for cooling compressed air;

said cooling means being coupled to said compressor means to receive compressed air therefrom and coupled to said intake means to direct cooled compressed air thereto;

an exhaust air path including turbine means for driving said compressor means, said turbine means being coupled to said exhaust means to receive engine exhaust gases to drive said turbine means;

a diversion air path including duct means for diverting compressed air from said intake air path to said exhaust air path; and control means for controlling the flow of compressed air through said duct means, said control means being responsive at least in part to the pressure differential between said intake air path and said exhaust air path;

said control means including valve means coupled in one of said air paths, sensing means for sensing the temperature of gases in said exhaust air path, and means for operating said valve means in accordance with the temperature sensed by said sensing means.

3. Supercharging apparatus for use with diesel engines having intake and exhaust means, said apparatus comprising:

an intake air path including compressor means for compressing air and cooling means for cooling compressed air;

said cooling means being coupled to said compressor means to receive compressed air therefrom and coupled to said intake means to direct cooled compressed air thereto;

an exhaust air path including turbine means for driving said compressor means, said turbine means being coupled to said exhaust means to receive engine exhaust gases to drive said turbine means;

a diversion air path including duct means for diverting compressed air from said intake air path to said exhaust air path; and control means for controlling the flow of compressed air through said duct means, said control means being responsive at least in part to the pressure differential between said intake air path and said exhaust air path;

said control means including a valve means coupled in one of said air paths and having a valve member movable between a closed position which prevents compressed air from diverting from said intake air path to said exhaust air path and an open position which permits compressed air to be diverted from said intake air path to said exhaust air path;

said valve means further including a biasing spring normally urging said valve member to its closed position and an adjustable screw coupled to said biasing spring for selectively adjusting the biasing force thereof;

said adjustable screw serving to adjust said biasing spring until the same exerts a predetermined force upon said valve means;

said valve member being movable from its closed position to its open position when said pressure differential between said intake air path and said exhaust air path is of sufficient magnitude to overcome said predetermined force.

References Cited by the Examiner

UNITED STATES PATENTS

| | | | |
|---|---|---|---|
| 1,612,053 | 12/1926 | Restany | 60—13 |
| 2,082,780 | 6/1937 | Buchi | 60—13 |
| 2,189,106 | 2/1940 | Garve et al. | 60—13 |
| 2,608,051 | 8/1952 | Nettel | 60—13 |
| 2,654,991 | 10/1953 | Nettel | 60—13 |
| 2,748,562 | 6/1956 | Kauffmann | 60—13 |
| 2,811,826 | 11/1957 | Alcock | 60—13 |
| 3,044,683 | 7/1962 | Wollenweber | 60—13 |
| 3,102,381 | 9/1963 | Tryhorn | 60—13 |
| 3,103,780 | 9/1963 | Tryhorn | 60—13 |
| 3,141,293 | 7/1964 | Crooks | 60—13 |

MARK NEWMAN, *Primary Examiner.*

RICHARD B. WILKINSON, *Examiner.*